United States Patent
Sylvest

[15] 3,703,275
[45] Nov. 21, 1972

[54] TREATMENT OF CEMENT RAW MATERIALS

[72] Inventor: Karl Jens Sylvest, Vigerslev Alle, Denmark

[73] Assignee: F. L. Smidth & Co., Cresskill, N.J.

[22] Filed: Feb. 17, 1971

[21] Appl. No.: 115,951

[30]    Foreign Application Priority Data

Feb. 26, 1970   Great Britain............9,421/70

[52] U.S. Cl. ...............................263/32 R, 263/53 R
[51] Int. Cl...............................................F27b 7/20
[58] Field of Search..................263/32 R, 53 R, 53 A

[56]          References Cited
          UNITED STATES PATENTS 3,507,482   4/1970   Kraskewski et al. ......263/53 R
3,512,340   5/1970   Golucke et al............263/32 R

*Primary Examiner*—John J. Camby
*Attorney*—Pennie, Edmonds, Morton, Taylor & Adams

[57]          ABSTRACT

In the processing of cement raw materials a slurry of those materials which includes alkalis is preheated and dried by hot gases from a kiln. These gases which are cooled by the drying process subsequently flow to a dust precipitator. An amount of hot gases from the kiln is allowed to by-pass the slurry and flow to the dust precipitator so as to bring the temperature of the gases entering the dust precipitator into the range of 125° to 250°C. Simultaneously, there is a reduction of the amount of alkali material carried into the kiln by the dried slurry.

10 Claims, 3 Drawing Figures

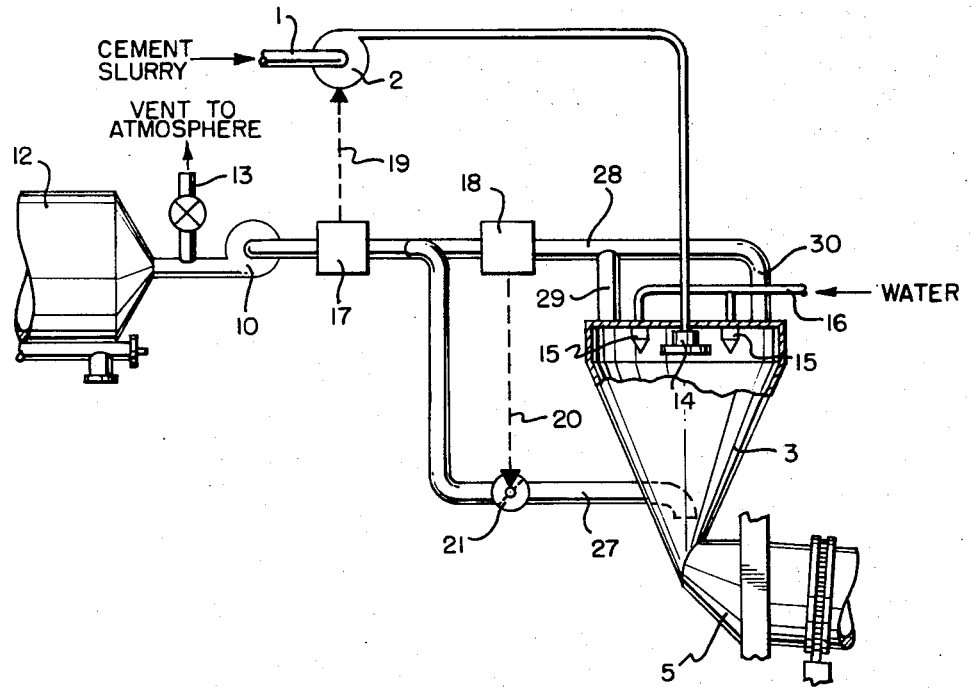

TREATMENT OF CEMENT RAW MATERIALS

BACKGROUND OF THE DISCLOSURE

1. Field of the Invention

This invention relates to an improved method for processing cement raw materials, and more particularly, to an improved method for processing cement raw materials by heating these materials in a rotary kiln and to a plant for preforming the method.

2. Description of Prior Art

Generally, in a wet process for burning cement the raw materials are first formed into an aqueous slurry, usually having a water content of between about 30 and 40 percent, and this slurry is then burned in a rotary kiln. The gases leaving this type of wet process kiln usually are at a comparatively high temperature; i.e. approximately 1000°–1150°C, so that a considerable amount of heat is wasted.

In some cases, therefore, the upper end of a wet process kiln comprises a preheating and drying section containing devices such as built-in chains by which the heat exchange between the hot kiln gases and the slurry is improved. The temperature of the gases leaving the kiln will then amount to approximately 125°–250°C.

In order to reduce heat loss and thus improve the thermal economy it has been proposed to replace such built-in devices by more efficient separate units, i.e., slurry driers, for preheating and drying the slurry, these being traversed by the gases from the kiln, which give up heat to the slurry. It is of course desirable that the slurry should be dried as completely as possible in a slurry drier and it can be converted to a dry powder with consequential reduction of the temperature of the gases to about 80° to 90°C.

Whether the wet process kiln is equipped with exterior or interior heat exchanging devices or none at all, there exists another problem. The gases leaving the plant carry dust, which must be removed before the gases are allowed to escape into the atmosphere. Accordingly, the gases are passed through a dust filter, which is frequently an electrostatic precipitator. A bag filter is sometimes used.

The efficiency of an electrostatic precipitator depends largely upon the temperature of the gases when they enter the precipitator. The electrostatic precipitator becomes less efficient when a temperature of about 300°C is exceeded, while if the temperature is less than say about 150°C it becomes corroded. Therefore, the temperature of the gases must be reduced to come within the range of 150° to 300°C, and preferably 150° to 180°C, before they can enter the dust filter.

Thus, while it is advantageous so far as the consumption of heat in the kiln plant is concerned to install separate efficient slurry driers, it is disadvantageous because the gases are then at too low a temperature when they enter the electrostatic precipitator. In other words, to dry the slurry to the maximum extent involves actual loss in thermal economy.

Another completely different problem arises from the fact that nearly all cement raw materials contain various amounts of undesirable volatile constituents in the form of alkalis. During the calcining and burning process in the kiln these constituents volatilize and are carried out of the kiln by the hot gases. This, in itself, presents no problem, but when the gases are passed through a slurry drier the alkalis condense and are mixed with the fresh preheated and dried material fed to the kiln. Increased quantities of alkalis may, therefore, circulate within the kiln and the slurry drier. This causes considerable difficulties in the burning of the dried slurry into cement clinker, severe caking in the plant, and also the clinker acquires too high an alkali content. The cakes formed may substantially reduce the efficiency of the plant and necessitate frequent stoppages for the purpose of breaking them.

SUMMARY OF THE INVENTION

It is therefore, the principal object of this invention to overcome the disadvantages stated hereinabove by providing an improved method for burning cement in a rotary kiln and an improved plant for performing the method.

The invention is concerned with processes in which the slurry, including alkalis, is dried on its way to the kiln by hot gases from the kiln and the gases thus cooled flow to a dust precipitator. The invention comprises causing such an amount of hot kiln gases to by-pass the slurry on their way to the dust precipitator as to bring the temperature of the gases entering the dust precipitator into the range of 125° to 250°C, with simultaneous reduction of the amount of alkalis carried into the kiln by the dried slurry. The gases leaving the kiln and containing a certain amount of volatile alkalis are thus divided into two streams, one of which is utilized for the preheating and drying, whereas the other passes directly to the dust precipitator.

In a process for burning cement raw materials in a rotary kiln wherein an aqueous slurry of the cement raw materials containing alkalis is preheated and dried on its way to the kiln by hot gases from the kiln and the gases thus cooled flow to a dust precipitator, the improvement comprises allowing an amount of the hot gases from the kiln to by-pass the slurry on their way to the dust precipitator whereby the temperature of the gases entering the dust precipitator is maintained in the range of about 125°C to about 250°C and the amount of alkalis carried into the kiln by the dried slurry is reduced.

It has now been found that by regulating the proportion of the gases that by-pass the slurry drier it is possible simultaneously to maintain the temperature of the gases entering an electrostatic dust precipitator within acceptable limits, say between 125° and 250°C, preferably between 150° and 180°C, and to achieve a balance between the amount of alkali carried out of the kiln and the amount introduced in the dried slurry, so that the caking ceases to be a troublesome problem. Because the hot by-passed stream of gas is mixed with the main stream which has passed through the slurry drier the temperature of the main stream can, and generally must, be reduced below the minimum of 125°C necessary hitherto in order to bring the temperature of the mixture into the proper range. The gain in utilized heat thus achieved in the slurry drier compensates for the heat lost by arranging for part of the gases to by-pass the slurry drier. Put in another way, the advantages attached to the method according to the invention consists in that both the alkali problem is substantially solved and the working conditions for the electrostatic dust precipitator are satisfactory without involving any decrease in the heat economy of the rotary kiln. Another advantage linked up with the idea of making part of the gases by-pass the slurry drier consists in that the gas velocity of main flow through the slurry drier will be reduced thereby with consequent reduced tendencies for the gases on passing through narrow cross-sections in the slurry drier to entrain solid raw material particles.

The proportion of the gases that are by-passed may vary, for example between 2 and 20 percent, though normally it need not exceed 10%. This proportion may be automatically controlled in accordance with the temperature of the gases entering the filter by inserting in the pipe that leads the combined gas streams to the dust precipitator a device responsive to temperature and arranged to operate a damper in a pipe through which gas that by-passes the slurry drier flows. The temperature of the combined streams may thus be kept substantially constant with consequent efficiency in operation.

The invention is particularly advantageous if the slurry is spray-dried, that is to say, if it is atomized in the kiln gases in the drier. This leads to an outstanding heat exchange with corresponding reduction in the temperature of the gases to, say, 80°C, since the slurry is effectively distributed as very fine particles in the gases.

The invention includes as novel plant the combination of a rotary kiln, a spray drier having an outlet for dried particles connected to the kiln, means for feeding slurry into the spray drier, a dust-precipitator, means including a fan-forming a path for a main flow of gases from the kiln through the spray drier to the dust precipitator, and a pipe through which part of the kiln gases by-pass the spray drier or that part of it in which the slurry is dried. Preferably means are provided for regulating the flow through the by-pass pipe, and these means are advantageously controlled by an instrument responsive to the temperature of the gases entering the precipitator.

Since the slurry drier in effect protects the precipitator by cooling the hot gases, it is important to provide protection for the precipitator if there should be any irregularity in the slurry feed, such for example as failure of the slurry-conveying apparatus. Preferably means are provided by which water can be injected into the slurry drier to cool the gases if necessary, and these means may be automatically controlled, for example, through a complete control system by which the gases are by-passing the electrostatic dust precipitator so as to be vented direct to the atmosphere and the fuel supply to the rotary kiln is interrupted and other safety measures are taken if there is an emergency.

BRIEF DESCRIPTION OF THE DRAWINGS

Plants for performing the method according to the invention are illustrated in the accompanying drawings, in which;

FIG. 3 is a diagrammatic view of a modified plant in which the slurry spray drier is directly connected to the rotary kiln.

DESCRIPTION OF THE PREFERRED EMBODIMENTS

Figure 1:
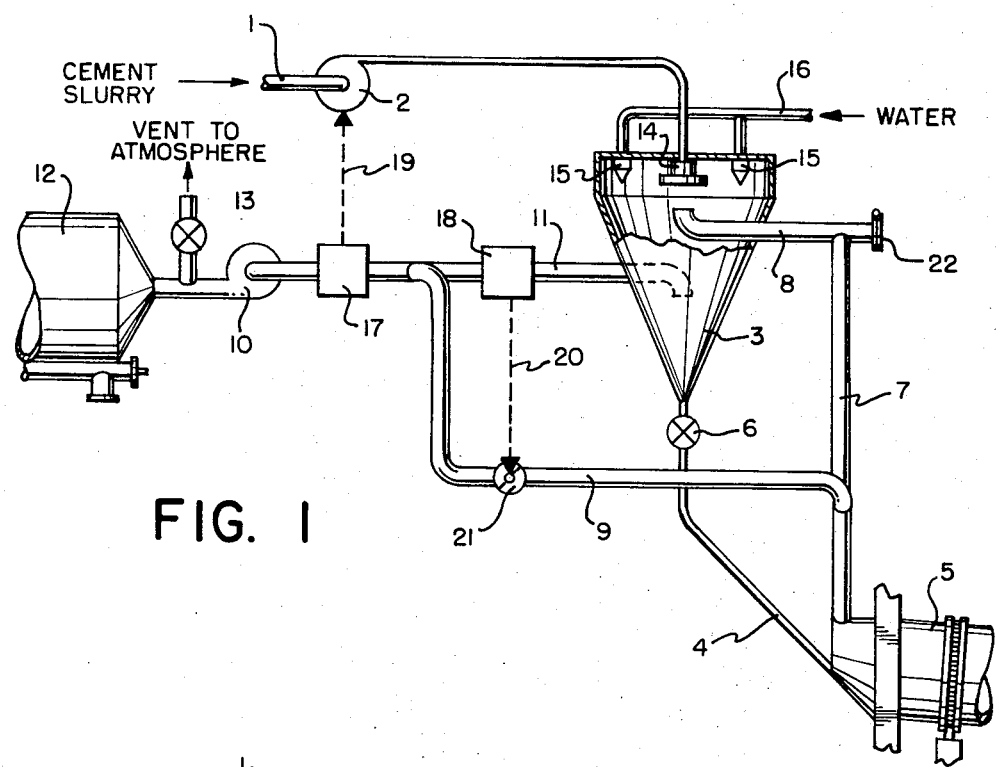
FIG. 1 is a diagrammatic view of a plant in which the slurry spray drier is arranged for countercurrent heat exchange between the gases and atomized slurry particles.

In the plant shown in FIG. 1, raw cement slurry is fed through a pipe 1 and forced by a pump 2 into a spray drier 3 through a rotating atomizer wheel 14. The dried slurry, i.e. the raw meal, is discharged into a pipe 4 which leads to a slurry kiln 5. A valve 6 in the pipe 4 controls the flow of the raw meal to the kiln and prevents the kiln gases from passing through the pipe. The kiln gases leave the kiln through a pipe 7 which divides into two branches, namely, a branch 8 leading to the spray drier 3 and a branch 9 leading to a fan 10. The mouth of the pipe 8 is directed upwards so the main stream of kiln gases is discharged upwards into contact with the downwardly injected slurry. The gases are removed from the spray drier through a pipe 11, the mouth of which lies inside the spray drier and is downwardly directed. The pipes 9 and 11 unite upstream of the fan 10, so that all the gases flow as a combined stream to an electrostatic precipitator 12 and then to atmosphere through a chimney (not shown). A pipe 13 is provided through which the combined stream can be vented directly to the atmosphere in an emergency.

The slurry injected into the spray drier is atomized to fine particles, i.e. raw meal, distributed evenly in the gases passing through the drier. The gases leaving the rotary kiln may have a temperature of about 1100°C and are cooled in the spray drier by heat exchange with the atomized rotary particles down to a temperature below about 100°C, i.e., about 80°C.

Alkalis in the slurry are introduced into the kiln and volatilized there so that most of them leave the kiln again together with the gases and dust particles. Those alkalis that come into contact with the atomized slurry particles condense on them and so are returned to the kiln, but the by-passed gas stream flowing through the pipe 9 removes a sufficient amount of the volatilized alkalis out of the circuit to substantially eliminate or reduce the problems caused by caking.

The combined stream passing to the electrostatic precipitator 12 may have a temperature of about 150°C which is a very suitable temperature of operation for this type of precipitator.

The dust collected in the precipitator may be discarded or utilized for other purposes, or it may be returned to the plant. However, the dust cannot be returned directly because of the alkalis in it, which must be removed by leaching before the dust returns to the plant.

As a safeguard against interruptions of the slurry feed, nozzles 15 through which water from a supply pipe 16 can be injected are provided in the spray drier so that the gases can be cooled enough to prevent damage to the precipitator and indeed to the drier itself. In this kind of emergency, the gases may be further cooled by admitting atmospheric air into the pipe 8 through a normally closed flap 22, or a valve in the pipe 13 may be opened, the gases all then passing directly to the chimney rather than through the precipitator 12.

Control instruments 17 and 18 responsive to temperature changes are provided in the pipe 11 and upstream the fan 10, respectively. As indicated by a dotted line 19, the instrument 17 is connected to the motor for the slurry pump 2 and serves to maintain a gas temperature in the pipe 11 at about 80°C. If for one reason or the other the temperature should rise above the value referred to, the instrument 17 will send a signal causing the slurry pump 2 to run faster with the result that more slurry is fed to the spray drier per time unit, and so the temperature of the gases passing through the pipe 11 will be lowered. Similarly, as indicated by a dotted line 20, the instrument 18 is connected to a damper 21 and serves to maintain a gas temperature at the suction side of the fan 10 at about 150°C. If for one reason or other the said temperature should rise above the value referred to the instrument 18 will send a signal causing the damper 21 to restrict the passage of gases through the pipe 9. If the gas temperatures referred to are falling instead of rising the action of instruments 17 and 18 will be reversed.

Figure 2:
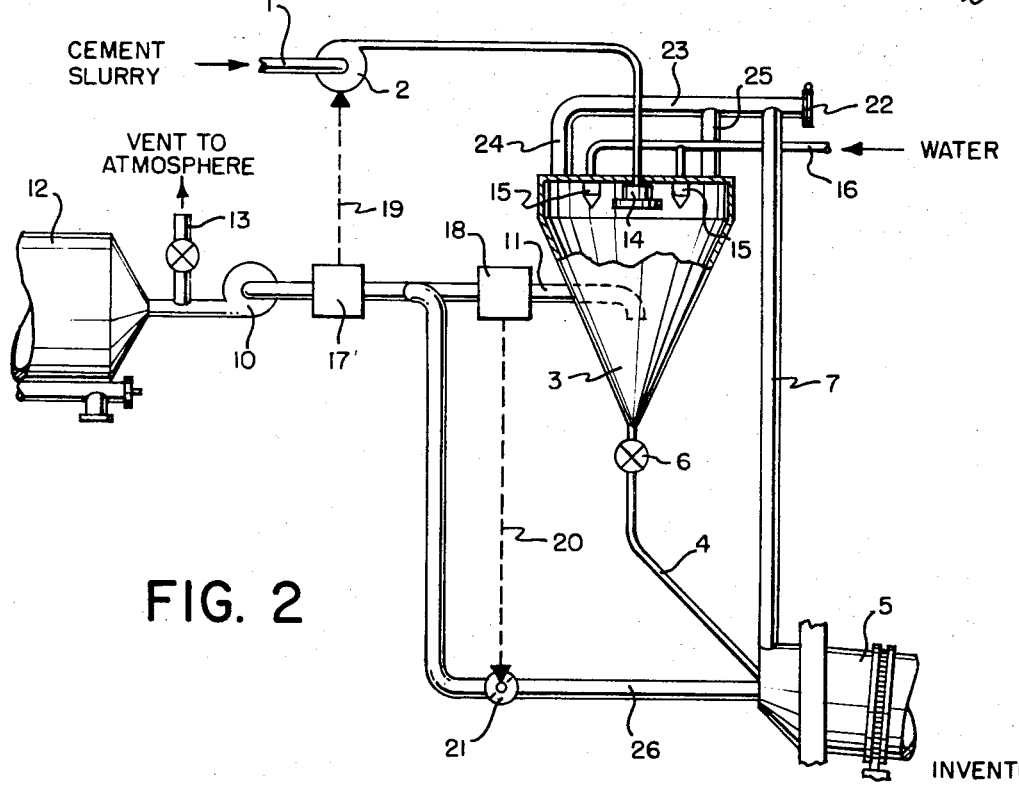
FIG. 2 is a diagrammatic view of a similar plant in which the heat exchange is concurrent.

In the modification shown in FIG. 2 the pipe 8 is replaced by a pipe 23 which branches into pipes 24 and 25 through which the hot gases are discharged downwardly into the spray drier concurrently with the atomized slurry. Another modification shown in FIG. 2 comprises replacing the pipe 9 by a pipe 26 which runs direct from the kiln to join the pipe 11 through which the gases leave the spray drier 3.

In the modification shown in FIG. 3 the bottom of the spray drier 3 forms a direct connection for the dried particles to the kiln and in effect constitutes the conduit by which hot gases are led into that part of the drier in which the slurry is atomized. The gases thus flow in countercurrent to the atomized particles. A pipe 27 is provided as the by-pass pipe, its mouth being downwardly directed and lying in the lower part of the spray drier 3, so that the by-passed stream comes into contact only with dried slurry particles and takes no effective part in the drying of the slurry. In fact all the gases leaving the kiln serve to heat the dried slurry particles as these fall through the bottom of the slurry drier into the kiln.

The by-pass pipe 27 merges into a pipe 28, which is joined also by two pipes 29 and 30 through which the main stream of gases leaves the drier 3.

I claim:

1. In a process for burning cement raw materials in a rotary kiln wherein an aqueous slurry of the cement raw materials containing alkalies is spray-dried on its way to the kiln by hot gases from the kiln so as to become cement raw meal, and the gases thus cooled flow to a dust precipitator, the improvement comprising allowing an amount of the hot gases from the kiln to by-pass the slurry spray-drier on their way to the dust precipitator so as to maintain in the range of about 125°C. to about 250°C. the temperature of the gases entering the dust precipitator and so as to reduce to an acceptable amount the alkali content carried into the kiln by the raw meal.

2. A process according to claim 1 wherein the dust precipitator is an electrostatic dust precipitator.

3. A process according to claim 1 wherein the temperature of the gases entering the precipitator is maintained in the range of about 150°C to about 180°C.

4. A process according to claim 1 wherein the proportion of the kiln gases that is by-passed is controlled in accordance with the temperature of the gases entering the dust precipitator.

5. A process according to claim 4 wherein the proportion of the kiln gases that is by-passed varies between 2 to 20 percent of the kiln gases.

6. A rotary kiln plant for buring cement raw materials comprising a rotary kiln for burning said raw materials, a spray drier having an outlet for dried particles connected directly to the kiln, means for feeding a slurry of the raw materials into the spray drier, a dust precipitator, means including a fan forming a path for a main flow of gases from the kiln through the spray drier to the dust precipitator, and a pipe through which the remaining part of the kiln gases by-pass the spray drier or that part of it in which the slurry is dried.

7. A rotary kiln plant according to claim 6 wherein means are provided for regulating the flow of gases through the by-pass pipe.

8. A rotary kiln plant according to claim 7 wherein the means for regulating the flow through the by-pass pipe are controlled by an instrument responsive to the temperature of the gases entering the dust precipitator.

9. A rotary kiln plant according to claim 6 wherein the bottom of the spray drier forms a direct connection for the dried particles to the kiln, a pipe with an open mouth in the lower part of the spray drier forms the by-pass pipe, and a pipe connected to the fan is provided for the removal of the main stream from the upper part of the spray drier.

10. A rotary kiln plant according to claim 9 wherein the by-pass pipe joins the pipe for the removal of the gases from the spray drier at a point upstream of the fan.

* * * * *